(12) United States Patent
Johnson et al.

(10) Patent No.: US 10,613,949 B2
(45) Date of Patent: Apr. 7, 2020

(54) FAILURE INDICATION IN SHARED MEMORY

(71) Applicant: Hewlett Packard Enterprise Development LP, Houston, TX (US)

(72) Inventors: Charles Johnson, San Jose, CA (US); Harumi Kuno, Cupertino, CA (US); Al Davis, Coalville, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/764,040

(22) PCT Filed: Sep. 24, 2015

(86) PCT No.: PCT/US2015/051904
§ 371 (c)(1),
(2) Date: Mar. 28, 2018

(87) PCT Pub. No.: WO2017/052548
PCT Pub. Date: Mar. 30, 2017

(65) Prior Publication Data
US 2018/0293144 A1   Oct. 11, 2018

(51) Int. Cl.
*G06F 11/20* (2006.01)
*G06F 11/16* (2006.01)
*G06F 11/07* (2006.01)

(52) U.S. Cl.
CPC ......... *G06F 11/2023* (2013.01); *G06F 11/07* (2013.01); *G06F 11/073* (2013.01); *G06F 11/0775* (2013.01); *G06F 11/0793* (2013.01); *G06F 11/16* (2013.01); *G06F 11/203* (2013.01); *G06F 11/2043* (2013.01); *G06F 2201/805* (2013.01)

(58) Field of Classification Search
CPC .................. G06F 11/2023; G06F 11/2033
USPC ................................. 714/4.11, 6.3
See application file for complete search history.

(56) References Cited

U.S. PATENT DOCUMENTS

| | | | |
|---|---|---|---|
| 4,894,828 A | 1/1990 | Novy et al. | |
| 6,295,573 B1 | 9/2001 | Bailey et al. | |
| 7,039,740 B2 | 5/2006 | Glasco et al. | |
| 7,987,383 B1* | 7/2011 | Coatney | G06F 11/006 709/226 |

(Continued)

FOREIGN PATENT DOCUMENTS

| | | | | |
|---|---|---|---|---|
| JP | 2006079161 A | * | 3/2006 | ......... H04L 41/0663 |
| WO | WO-2015052836 | | 4/2015 | |

OTHER PUBLICATIONS

Extended European Search Report, EP Application No. 15904889.1, dated Nov. 16, 2018, pp. 1-14, EPO.

(Continued)

*Primary Examiner* — Chai M Ko
(74) *Attorney, Agent, or Firm* — Hewlett Packard Enterprise Patent Department

(57) ABSTRACT

In some examples, a node of a computing system may include a failure identification engine and a failure response engine. The failure identification engine may identify a failure condition for a system function of the node and the failure response engine may store a failure indication in a shared memory to trigger takeover of the system function by a different node of the computing system.

13 Claims, 8 Drawing Sheets

(56) References Cited

U.S. PATENT DOCUMENTS

| | | | |
|---|---|---|---|
| 8,316,110 B1* | 11/2012 | Deshmukh | G06F 11/1484 709/202 |
| 2003/0135782 A1* | 7/2003 | Matsunami | G06F 11/0727 714/4.5 |
| 2004/0034816 A1 | 2/2004 | Richard | |
| 2004/0139168 A1* | 7/2004 | Tanaka | G06F 3/0614 709/213 |
| 2005/0120354 A1* | 6/2005 | Sunada | G06F 11/3433 719/310 |
| 2005/0159927 A1 | 7/2005 | Cruz et al. | |
| 2006/0053336 A1 | 3/2006 | Pomaranski et al. | |
| 2006/0156189 A1* | 7/2006 | Tomlin | G06F 11/1068 714/763 |
| 2007/0234115 A1 | 10/2007 | Saika | |
| 2008/0010506 A1 | 1/2008 | Tabei et al. | |
| 2009/0177914 A1 | 7/2009 | Winchell | |
| 2011/0228668 A1* | 9/2011 | Pillai | G06F 11/2023 370/217 |
| 2011/0252272 A1* | 10/2011 | Goodwin | G06F 11/0778 714/4.5 |
| 2012/0131309 A1 | 5/2012 | Johnson et al. | |
| 2014/0201314 A1* | 7/2014 | Borkenhagen | G06F 11/1666 709/216 |
| 2015/0154079 A1 | 6/2015 | Lightner et al. | |
| 2015/0269039 A1* | 9/2015 | Akirav | G06F 11/2007 714/4.11 |
| 2015/0331766 A1* | 11/2015 | Sarfare | G06F 11/1662 714/4.11 |
| 2016/0139943 A1* | 5/2016 | Bezbaruah | G06F 9/45558 718/1 |

OTHER PUBLICATIONS

Delivering High Availability Solutions with Red Hat Cluster Suite, (Research Paper), Sep. 2003, 17 Pages.

International Searching Authority, The International Search Report and the Written Opinion, dated Jul. 11, 2016, 13 Pages.

* cited by examiner

FAILURE INDICATION IN SHARED MEMORY

BACKGROUND

With rapid advances in technology, computing systems are increasingly prevalent in society today. Vast computing systems execute and support applications that may communicate and process immense amounts of data, many times with performance constraints to meet the increasing demands of users. Increasing the efficiency and reliability of computing systems will further improve user experience.

BRIEF DESCRIPTION OF THE DRAWINGS

Certain examples are described in the following detailed description and in reference to the drawings.

DETAILED DESCRIPTION

The disclosure herein may provide for failure indication storage in a shared memory. The failure indication may be stored by a node in a computing system that has detected a failure condition expected to cause system functions provided by the node to fail, for example through overheating, kernel panic, memory failure, or other conditions. By storing the failure indication in a shared memory, the failing node may trigger takeover of failing system functions by other nodes in the computing system, thus maintaining overall system functionality and preventing system downtime. Storage of the failure indication in a shared memory may increase the speed at which another node takes over the failing functions of a node, as the computing system may support memory accesses at a faster rate than other failure alert mechanisms, such as network broadcasts and periodic check-in messages. Thus, the features described herein may provide increased efficiency and speed in replacing failing system functions, and in some cases provide system function takeover in the order of microseconds or faster.

Figure 1:
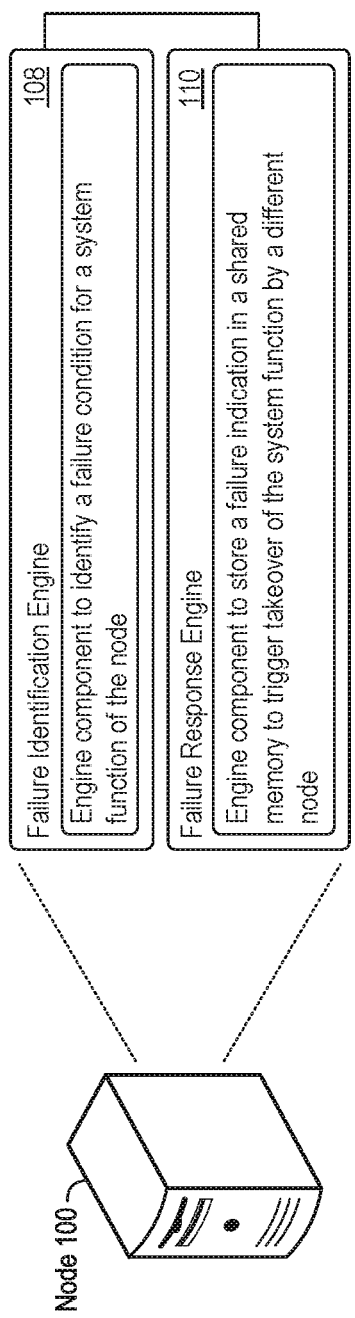
FIG. 1 shows an example of a node that supports storage of a failure indication storage in a shared memory.

FIG. 1 shows an example a node 100 that that supports failure indication storage in a shared memory. A node may refer to any component of a computing system that includes a physical or logical computing entity, examples of which include computing circuitry, a central processing unit (CPU), microprocessor, graphics processing unit, application specific integrated circuitry (ASIC), a physical computing device, an application server, and many more examples. The node may include a memory controller or interface, which may manage memory access traffic for the node, for example to a shared memory accessible and shared by multiple nodes in the computing system.

The node 100 may support takeover of system functions provided by the node 100 when the node 100 malfunctions or experiences a system failure. In that regard, the node 100 may provide an indication of a system failure or malfunction, alerting other nodes to take over system functions, application functionality, or other processes handled by the node 100. In the example shown in FIG. 1, the node 100 includes a failure identification engine 108 and a failure response engine 110. The node 100 may implement the failure identification engine 108, the failure response engine 110, or both, as executable instructions stored on a machine-readable medium, hardware, electronic circuitry, firmware, logic, or as any combination thereof.

The failure identification engine 108 may identify a failure condition for a system function of the node 100. The failure condition may refer to any system condition that may cause or expect to cause a failure for the system function provided by the node 100. Examples of failure conditions may thus include kernel panic, system overheating beyond a threshold temperature or heat level, power outage, hardware failure, memory corruption, and more. The failure identification engine 108 may identify any number of configurable failure conditions, for example as specified by a system administrator or other management entity. In some examples, the failure identification engine 108 identifies the failure condition through triggering of a non-maskable interrupt (NMI) by an interrupt handler of the operating system of the node 100.

A failure condition identified by the failure identification engine 108 may cause a failure of the node 100 to provide a system function. A system function may refer to any system, device, or application functionality provided by the node 100. The system function may thus include execution of application threads or processes through computing resources of the node 100, data processing services provided by the node 100, or other distributed services supported by the node 100. The failure response engine 110 may store a failure indication in a shared memory to trigger takeover of the system function by a different node of the computing system. Thus, the node 100 may identify system failure conditions and trigger system function takeover through the failure identification engine 108 and failure response engine 110. Example features with regards to these engines 108 and 110 are described in greater detail next.

Figure 2:
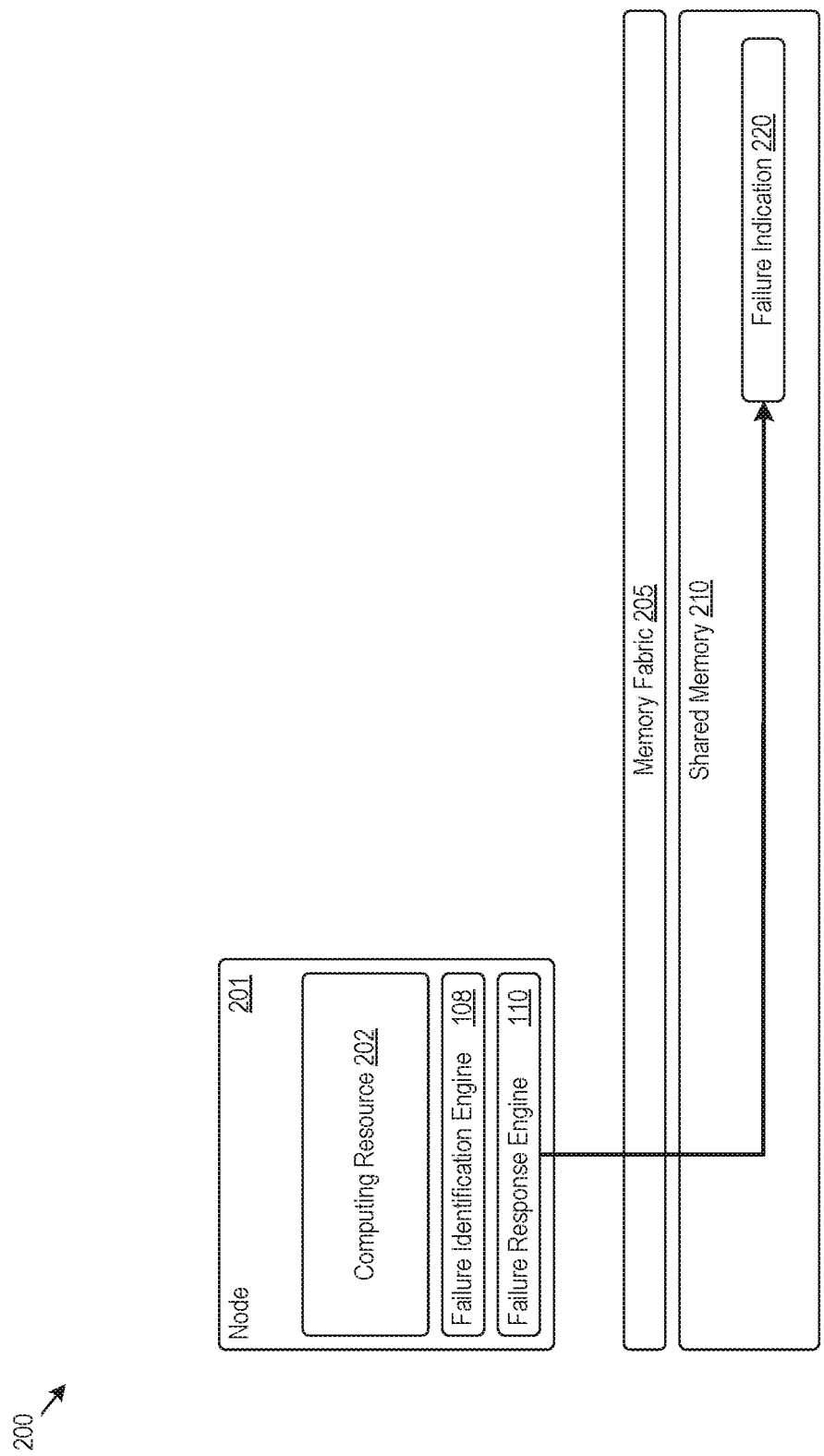
FIG. 2 shows an example of a computing system that supports failure indication storage in a shared memory.

FIG. 2 shows an example of a computing system 200 that supports failure indication storage in a shared memory. In the example shown in FIG. 2, a node 201 of the computing system 200 includes a computing resource 202, failure identification engine 108, and failure response engine 110. The computing resource 202 may be any hardware or logic implemented by the node 201 that provides system functions for the computing system. Thus, the computing resource 202 may include a CPU (or multiple CPUs), a system on a chip (SoC), embedded controllers, microprocessors, or any other electronic circuitry. Although only the node 201 is shown in FIG. 2, the computing system 200 may include multiple other nodes that may likewise provide system functions or other computing capability for the computing system 200.

The computing system 200 shown in FIG. 2 also includes a memory fabric 205 and a shared memory 210. The memory fabric 205 may also be referred to as a memory network, and may take the form of hardware or circuitry that interconnects nodes of the computing system 200 to the shared memory 210. In some examples, the memory fabric 205 routes memory access requests (e.g., read or store instructions) to a corresponding portion of the shared memory 210 targeted by the memory access requests. As such, the memory fabric 205 may include a switching fabric, switches, or other routing circuitry to direct memory access requests received from a node in a computing system 200 to the portion of the shared memory 210 specified in the memory access request.

The shared memory 210 may be any physical or logical memory shared by multiple nodes in the computing system 200. The shared memory 210 may, for example, include or be part of a fabric attached memory. In some examples, the shared memory 210 provides a global addressing scheme used by the nodes to access and share data in the shared memory 210. The shared memory 210 may include volatile memory, for example in the form of dynamic random-access memory (DRAM). The shared memory 210 may include non-volatile memory, for example in the form of read-only memory (ROM), flash memory, memristor memory, spin-transfer torque memory, or volatile memory mapping a file stored on a device such as a disk or solid-state drive.

Turning to takeover features provided by the node 201, the failure response engine 110 may store a failure indication in a shared memory 210 to trigger takeover of the system function by a different node of the computing system 200. The failure response engine 110 may do so when the failure identification engine 108 identifies a failure condition, thus alerting other nodes in the computing system 200 of a possible system failure or processing downtime for the node 201. In the example in FIG. 2, the failure response engine 110 stores a failure indication 220 in the shared memory 210, which may trigger a takeover of the system functions provided by the node 201 to maintain system uptime.

The failure response engine 110 may generate the failure indication 220 as any message or indication indicating failure of the node 201, such as failure to provide a particular system function, an impending system failure, or various other indications. The failure indication 220 may specify the context of the failure condition, the specific system functions provided by the node 201, or other information that would support takeover of the system functions provided by the (failing) node 201 by other nodes in the computing system 200. In that regard, the failure indication 220 may include a failed function indication for a system function provided by the node 201, allowing other nodes to takeover (e.g., replace) the system function specified in the failed function indication.

The failure response engine 110 may store the failure indication 220 in the shared memory 210 by issuing a store instruction to store the failure indication 220. As another example, the failure response engine 110 may store the failure indication 220 in the shared memory 210 by sending a store instruction for the failure indication 220 across the memory fabric 205 for storage in the shared memory 210. Thus, the failure response engine 110 may store the failure indication 220 through instruction, causation, or initiation of the store process, without having to be the actual physical or logical entity that performs the store operation to store the data bits representing the failure indication 220 in a physical memory cell implemented by the shared memory 210.

In storing the failure indication 220 in the shared memory 210, the failure response engine 110 may indicate a message type of the store instruction, e.g., as a high priority instruction or of a failure indication storage type. The failure response engine 110 may indicate the message type by, for example, setting a failure indication flag in a header of the store instruction. The memory fabric 205 or other memory routing logic in the computing system 200 may route the store instruction or store the failure indication 220 with increased priority, such as to meet a particular quality-of-service requirement or service level agreement (SLA).

The failure response engine 110 may store the failure indication 220 at a specified location within the shared memory 210 to trigger takeover of a system function of the node 201. To illustrate, the shared memory 210 may allocate particular memory regions (e.g., address ranges) for specifically storing failure indications. Thus, a node in the computing system 200 that has identified a failure condition may store a failure indication in a particular address range or memory region to indicate system failure and trigger takeover by other nodes in the computing system 200.

A particular address in the allocated address range may indicate the originating node of a stored failure indication. For example, the shared memory 210 may include an address range that acts as a source vector, wherein particular addresses in the address range are associated with particular nodes of the computing system 200 and indicate a source node originating data stored at the particular addresses. Thus, the failure response engine 110 may store the failure indication 220 at a particular address (or at a particular offset from a reference address) to indicate the node 201 as originating the failure indication 220 and requesting takeover of the system functions provided by the node 201. Storage of data in a source vector (which may also be referred to as a memory region mailbox) may also trigger a wakeup of a particular node or computing resource, or otherwise trigger an interrupt to perform a particular task, such as replacing a system function of a failing node in the computing system 200.

In some examples, the failure response engine 110 stores the failure indication 220 in a particular memory region of the shared memory 210 that is associated with a different node, triggering the takeover of the system function by the different node. A memory region may be associated with a node that manages or implements the memory region, such as a particular physical memory module implemented within the node. As such, the failure response engine 110 may store the failure indication 220 in at a target address mapped to a memory module implemented by a different node, which may trigger the different node to takeover a system function provided by the node 201.

By storing the failure indication 220 in a shared memory 210, the failure response engine 110 may trigger takeover of system functions of the node 201 without communicating direct alerts to other nodes in the computing system 200. That is, the failure response engine 110 may support system function takeover with a memory access operation, and may do so when other node components or sub-systems have failed. Without having to perform targeted communications to other nodes in the computing system 200, the failure response engine 110 may support system function takeover even when a networking sub-components of the node 201 have failed, for example, and the failure response engine 110 may support system function takeovers even when a network stack of the node 201 has failed.

Figure 3:
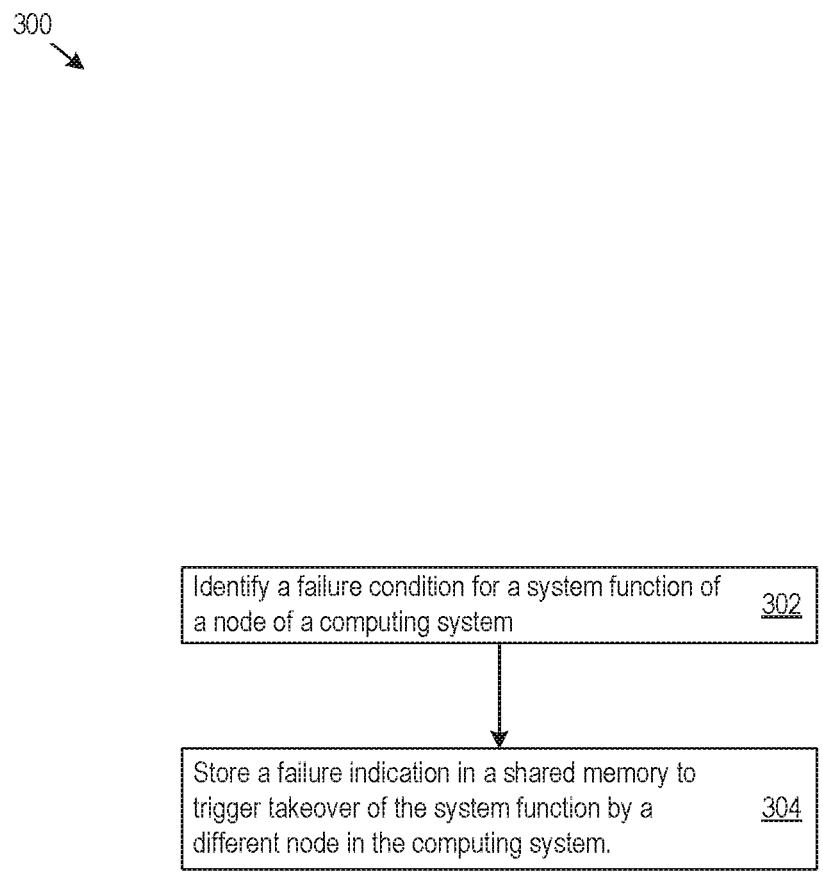
FIG. 3 shows an example of logic that a node may implement to support storage of a failure indication in a shared memory.

FIG. 3 shows an example of logic 300 that a node may implement to support storage of a failure indication in a shared memory. The node may implement the logic 300 as hardware, electronic circuitry, firmware, executable instructions stored on a non-transitory machine-readable medium, or as combinations thereof. For example, the node may implement the logic 300 through the failure identification engine 108, the failure response engine 110, or both. The node 100 may perform the logic 300 through a combination of the failure identification engine 108 and failure response engine 110 as a method or process to support storage of a failure indication in a shared memory.

The failure identification engine 108 may identify a failure condition for a system function of a node in the computing system (302), such as for the node implementing the failure identification engine 108. In response to such an identification, the failure response engine 110 may store a failure indication in a shared memory to trigger takeover of the system function by a different node in the computing system (304), for example in any of the ways described herein.

Figure 4:
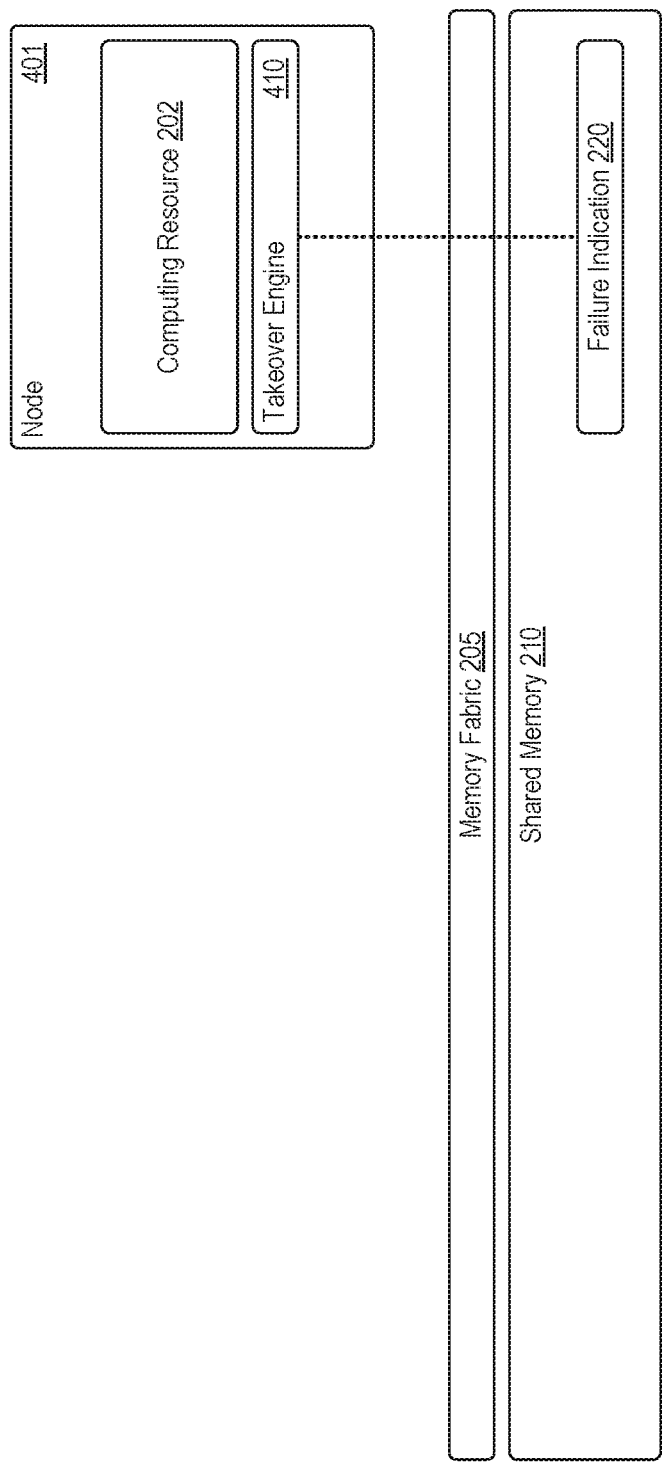
FIG. 4 shows an example of system function takeover by a node according to a failure indication stored in a shared memory.

FIG. 4 shows an example of system function takeover by a node according to a failure indication stored in a shared memory. In the example shown in FIG. 4, a node 401 includes a computing resource 202 and a takeover engine 410. The node 401 may implement the takeover engine 410 as executable instructions stored on a machine-readable medium, hardware, electronic circuitry, firmware, logic, or as any combination thereof. The node 401 may be part of a computing system that includes the memory fabric 205 and shared memory 210.

The takeover engine 410 may support takeover of system functions from another node in a computing system that has experienced a failure. In particular, the takeover engine 410 may identify that a failure indication 220 has been stored in a shared memory 210. The takeover engine 410 may then takeover (e.g., replace) a system function provided by the node originating the failure indication 220 stored in the shared memory 210. To identify that the failure indication 220 is stored in the shared memory 210, the takeover engine 410 may poll particular address ranges in the shared memory 210 allocated for failure indication storage. As another example, the takeover engine 410 may receive a notification from other monitoring logic or circuitry implemented by the node 401 or other memory routing logic when the failure indication 220 is stored in the shared memory 210. As yet another example, storage of the failure indication 220 in a particular memory address in the shared memory 210 may trigger an interrupt or notification to the takeover engine 410, by which the takeover engine 410 may replace failing or failed system functions of another node in a computing system.

To takeover system functions of a failing (or failed) node, the takeover engine 410 may determine the node in the computing system that originated the failure indication. For instance, the takeover engine 410 may identify that the failure indication 220 is stored in a particular address range in the shared memory 210 that is associated with the originating node. In some examples, the particular address at which the failure indication 220 is stored may indicate the originating node as well as indicate to the takeover engine 410 of the node 401 to perform the takeover (as opposed to other nodes in the computing system). Such scenario may occur when the failure indication 220 is stored, for example, at a source vector or mailbox of a memory module implemented by the node 401 and at a particular address or at a particular offset from a reference address that the takeover engine 410 correlates to the originating node. In yet other examples, the takeover engine 410 may identify the failure indication 220 and confer with other nodes in the computing system as to which particular node(s) will handle the takeover of the system functions provided by the failing node originating the failure indication 220.

In performing a takeover according to a failure indication 220 stored in a shared memory 210, the takeover engine 410 may determine a system function provided by the node originating the failure indication 220 to takeover or replace. The failure indication 220 itself may specify system functions provided by the failing node through failed function indications, and the takeover engine 410 may extract the system functions from the failure indication 220 stored in the shared memory 210. Then, the takeover engine 410 may replace the system functions on behalf of the originating node, for example by launching replacement threads or processes in the node 401 to provide the system functions.

Figure 5:
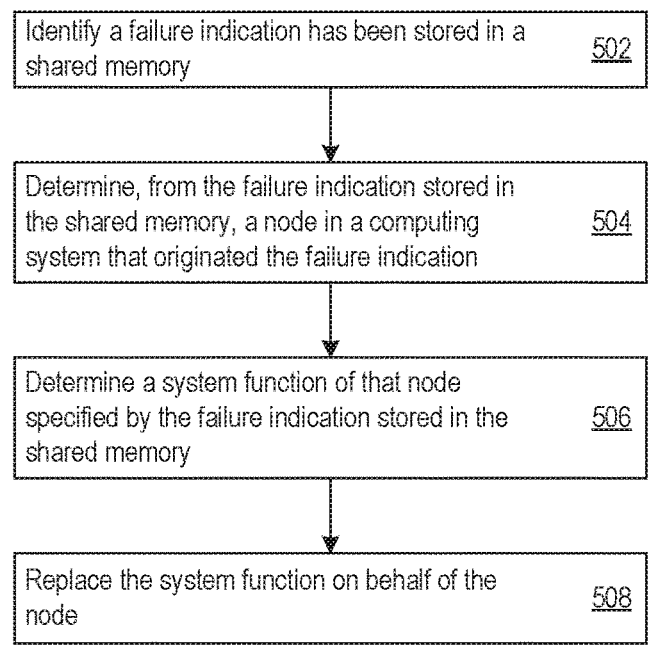
FIG. 5 shows an example of logic that a node may implement to support system function takeover according to a failure indication stored in a shared memory.

FIG. 5 shows an example of logic 500 that a node may implement to support system function takeover according to a failure indication stored in a shared memory. The node may implement the logic 500 as hardware, electronic circuitry, firmware, executable instructions stored on a non-transitory machine-readable medium, or as combinations thereof. For example, the node may implement the logic 500 through takeover engine 410 and takeover engine 410 may perform (e.g., execute) the logic 500 as a method or process to support takeover according to a failure indication stored in a shared memory.

The takeover engine 410 may identify that a failure indication has been stored in a shared memory (502). In response, the takeover engine 410 may determine a node in a computing system that originated the failure indication (504), for example from the failure indication stored in the shared memory (e.g., explicitly specified in the failure indication or implicitly by a location at which the failure indication is stored). The takeover engine 410 may also determine a system function of the node specified by the failure indication stored in the shared memory (506) and replace the system function on behalf of the node (508). In some examples, a system configuration may specify which functions are distributed amongst different nodes in a computing system. As such, the takeover engine 410 may determine the system function of the node to takeover without referencing the failure indication. Put another way, the failure indication need only indicate that the node originating the failure indication is failing (or has failed), and the takeover engine 410 may replace the system function on behalf of the node accordingly.

In determining the node that originated the failure indication, the takeover engine 410 may identify that the failure indication is stored in a particular address range in the shared memory associated with the node. As another example, the takeover engine 410 may determine the node that originated the failure indication by determining that the failure indication is stored at a particular offset from a reference memory address and correlate the offset to the node as originating the failure indication. Regarding the system function determination, the takeover engine 410 may determine the system function from a failed function indication specified in the failure indication.

The examples above include description of how a node may store a failure indication in a shared memory triggering takeover by a different node in a computing system as well as how a node may perform a system function takeover in response to identifying a failure indication stored in the shared memory. A node in the computing system may provide any combination of the failure response and system function takeover features described above. Put another way, a particular node in the computing system may implement the failure identification engine 108, failure response engine 110, and the takeover engine 410, which may allow the particular node to store a failure indication in the shared memory when the particular node is failing as well as takeover system functions of another node in the computing system that is (or has) failed.

Figure 6:
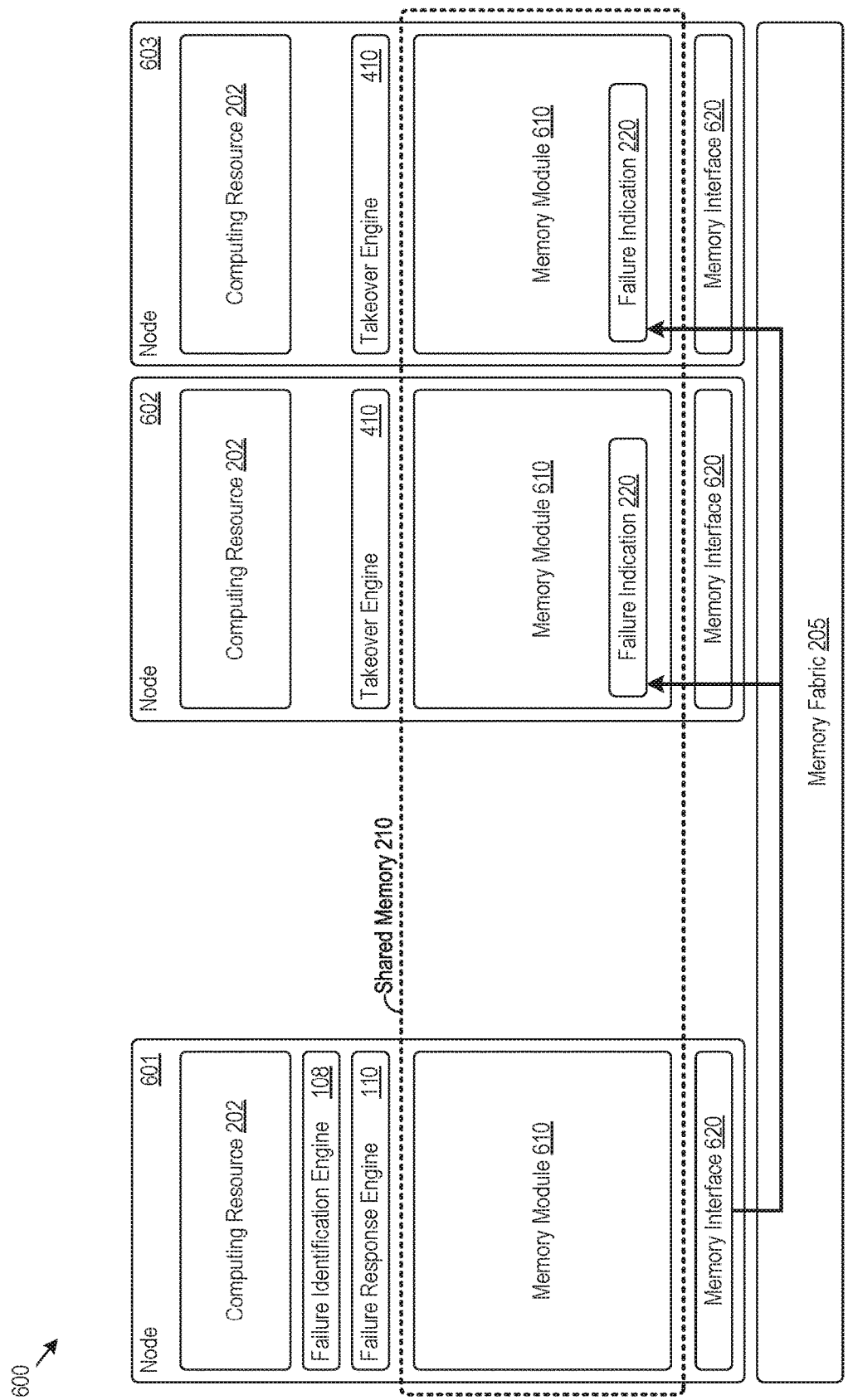
FIG. 6 shows an example of a computing system that supports storage of a failure indication in multiple locations of a shared memory.

FIG. 6 shows an example of a computing system 600 that supports storage of a failure indication in multiple locations of a shared memory. The computing system 600 shown in FIG. 6 includes multiple nodes, including those labeled as nodes 601, 602, and 603. The nodes 601, 602, and 603 shown in FIG. 6 respectively include a computing resource 202, a memory module 610, and a memory interface 620.

In FIG. 6, the shared memory 210 is physically implemented through multiple memory modules 610. A memory module may be a physical memory device implemented by a node, and multiple memory modules 610 implemented by nodes in the computing system 600 may collectively form the shared memory 210. Thus, the shared memory 210 may be a logical memory entity commonly accessible by the nodes 601, 602, and 603 of the computing system 600, and may be physically implemented through the memory modules 610 provided by the nodes 601, 602, and 603 of the computing system 600. The memory interfaces 620 of the nodes may respectively provide access to the shared memory 210, which may include processing memory access requests for sending through the memory fabric 205 to the appropriate target region (and thus, appropriate memory module 610 in the computing system 600). In some examples, the memory interfaces 620 may be part of the memory fabric 205 instead of the nodes.

In the example shown in FIG. 6, the node 601 is shown to include a failure identification engine 108 and failure response engine 110, though the node 601 may also include a takeover engine 410 as well. The nodes 602 and 603 are shown to respectively include a takeover engine 410, though the nodes 602 and 603 may also respectively include a failure identification engine 108 and failure response engine 110 as well.

An illustration of storing a failure indication in multiple locations in a shared memory is described next. The failure identification engine 108 may identify a failure condition for a system function of the node 601, such as when the node 601 or a component of the node 601 is failing. For instance, the failure identification engine 108 may identify the failure condition when the computing resource 202 fails, crashes, overheats, or is otherwise comprised, and may do so even when other node components, such as the memory module 610, remain operable. In that regard, the node 601 may trigger takeover of system functions provided by the computing resource 202 (e.g., due to a hardware failure of the computing resource 202), even while continuing to implement and provide shared data through an operable memory module 610, for example.

The failure response engine 110 of the failing node 601 may respond to identification of the failure condition by storing a failure indication in the shared memory 210. In this illustration, the failure response engine 110 stores the failure indication at multiple locations in the shared memory 210, in particular at various regions of the shared memory 210 associated with various nodes that may replace the failing system functions of the node 601. As such, the failure response engine 110 may issue multiple store instructions to store a failure indication 220, for example in the two memory regions of the shared memory 210 associated with the node 602 and the node 603. The memory interface 620 of the node 601 may process or route the store instructions across the memory fabric 205 multiple locations, such as to the target memory addresses implemented by the memory modules 610 of the node 602 and 603 at which the failure indication 220 is stored.

As described above, the failure response engine 110 may store a failure indication at multiple memory locations (e.g., regions) of the shared memory 210, and each of the multiple memory regions may be associated with a particular node of the computing system 600. Put another way, the failure response engine 110 may store copies of the failure indication 220 at multiple locations in the shared memory 210.

In doing so, the failure response engine 110 may store the failure indication 220 at a specified location of the multiple memory regions to indicate that the node 601 originated the failure indication 220. For example, the nodes 602 and 603 may each implement a source vector or mailbox in their respective memory modules 610, through which other nodes in the computing system 600 may store failure indications 220. The failure response engine 110 of the node 601 may store the failure indication 220 at the same offset or the same location in the source vectors or mailboxes of the nodes 602 and 603 to indicate the node 601 as originating the failure indication 220 (though, the locations or offsets of the multiple source vectors or mailboxes where the failure indication is stored may have differing global addresses in the shared memory 210).

When the failure response engine 110 stores a failure indication in multiple locations in the shared memory 210, multiple nodes in the computing system 600 may determine which node(s) will take over the system functions of the node originating the failure indication. To illustrate through FIG. 6, the takeover engines 410 of the nodes 602 and 603 may each identify a failure indication 220 stored in their respective memory modules 610. In response, the takeover engines 410 may confer or delegate the node 602, the node 603, or a combination of both to perform a system function takeover for the system functions of the failing or failed node 601. Thus, the failure response engine 110 may support system function takeover by storing the failure indication at multiple locations in the shared memory, which may trigger multiple nodes to respond.

In some examples, a node or other memory routing logic in a computing system may initiate a system function takeover on behalf of a failing node prior to actually storing a failure indication in the shared memory. That is, the computing system may support triggering the system function takeover prior to the failure indication being written to the physical memory location (e.g., of a memory module 610) in the shared memory 210. As one example, a memory interface of a node may identify a store instruction for a failure indication routed across the memory fabric 205 and, in response, initiate takeover of the failing system functions for failing node that originated the failure indication. One such example is presented through FIG. 7.

Figure 7:
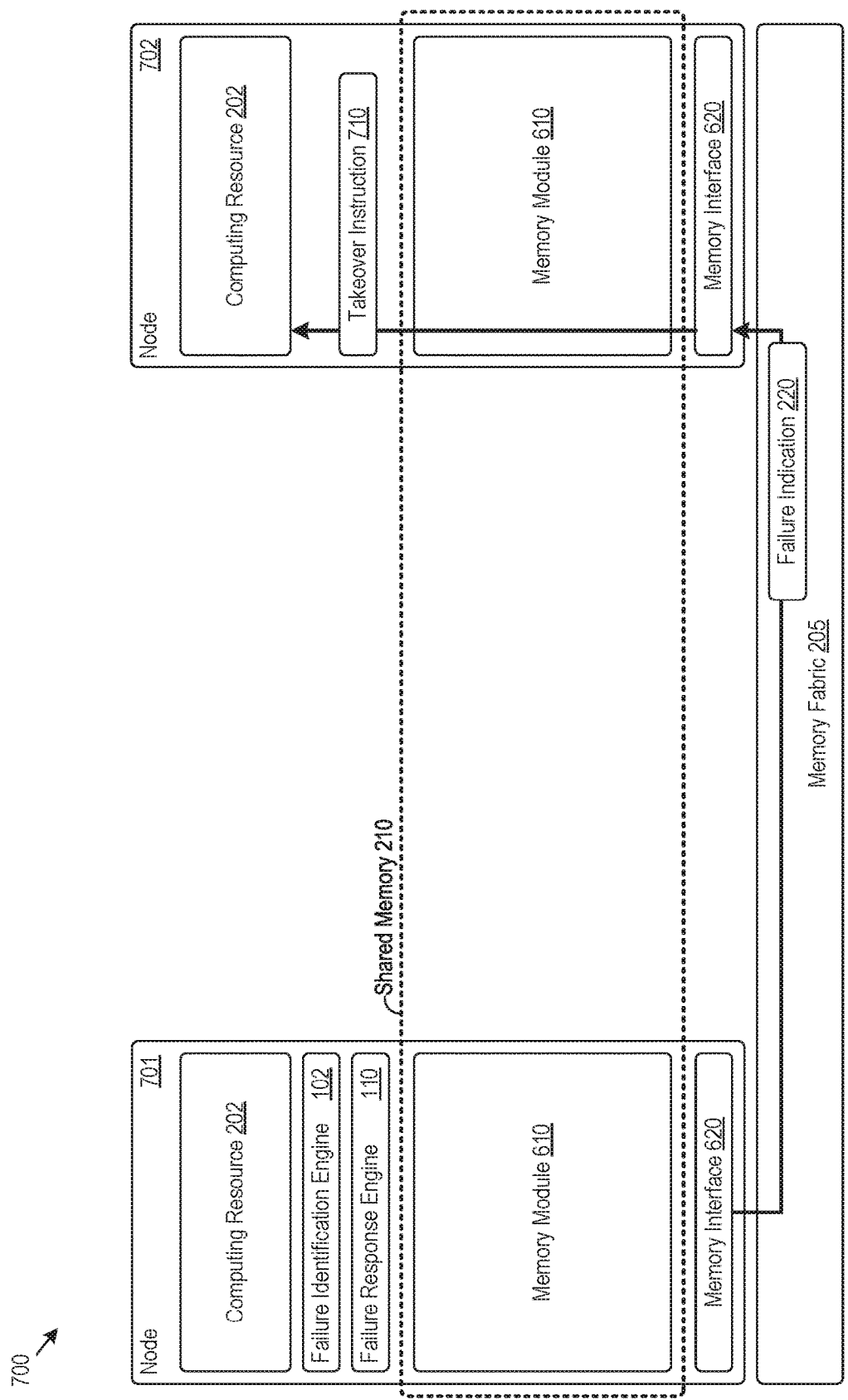
FIG. 7 shows an example of a computing system that supports system function takeover according to identification of a store instruction to store a failure indication in a shared memory.

FIG. 7 shows an example of a computing system 700 that supports system function takeover according to identification of a store instruction to store a failure indication 220 in a shared memory 210. The computing system 700 shown in FIG. 7 includes the nodes 701 and 702, each of which may include a computing resource 202, memory module 610, and memory interface 620. The memory modules 610 of the nodes 701 and 702 may physically form (at least in part) the shared memory 210.

The failure identification engine 108 may identify a failure condition for system functions provided by the node 701. In response, the failure response engine 110 of the node 701 may store a failure indication 220 in the shared memory 210 by issuing a store instruction to store the failure indication 220 at a particular address in the shared memory 210. The particular address targeted in the store instruction may be physically implemented by the memory module 610 of the node 702. As such, the memory interface 620 of the node 701 may send the store instruction across the memory fabric 205, which may route the store instruction for the failure indication 220 to the memory interface 620 of the node 702. The memory interface 620 of the node 702 may receive the store instruction to store the failure indication 220 in a physical location of the memory module 610 implemented by the node 702.

The memory interface 620 of the node 702 may identify the store instruction as one to store a failure indication 220, and do so prior to physically storing the failure indication in target location in the memory module 610 of the node 702. In response to such an identification, the memory interface 620 may initiate or trigger the takeover of the system functions of the node 701, which may occur prior to actually (e.g., physically) storing the failure indication 220 in the shared memory 210. In the example shown in FIG. 7, the memory interface 620 sends a takeover instruction 710 to the computing resource 202 of the node 702, which may cause the node 702 to launch an execution thread or process to replace a system function of the failing node 701. Thus, the computing system 700 may support system function takeover in response to identifying a store instruction to store a failure indication in a shared memory.

In the example shown in FIG. 7, the memory interface 620 of the node 702 implementing the physical location for storing failure indication 220 triggers the system function takeover. The memory interface 620 may, for example, initiate an interrupt that causes the computing resource 202 of the node 702 to launch the replacement threads, as the memory interface 620 identifying the store instruction for the failure indication 220 is part of the same node 702 that will replace the system functions of the failing node 701. When the memory interface 620 of the node implementing the physical memory location where the failure indication 220 is to be stored in shared memory 210 identifies the store instruction, the speed at which the system function take over occurs may increase, as the memory interface 620 need not communicate with an external entity to initiate the replacement execution threads. Instead, the memory interface 620 may support system function takeover prior even storing the failure indication 220 at increased speeds, possibly even supporting system function takeover in microseconds.

While one example is provided in FIG. 7, any memory routing logic at any routing point of a store instruction in the computing system may similarly identify the store instruction for the failure indication 220 and trigger a system function takeover. For example, the memory interface 620 of the node 701 originating the failure indication 220 or routing logic of the memory fabric 205 may implement any of the features described above to trigger the system function takeover to replace system functions of a failing node.

Figure 8:
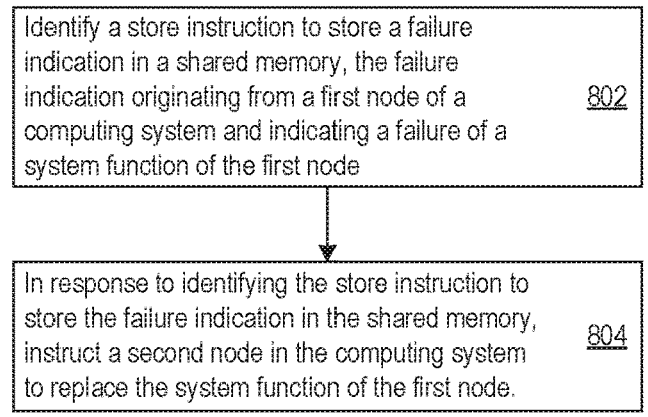
FIG. 8 shows an example of logic that a computing system may implement to support system function takeover according to identification of a store instruction to store a failure indication in a shared memory.

FIG. 8 shows an example of logic 800 that a computing system may implement to support system function takeover according to identification of a store instruction to store a failure indication in a shared memory. Any portion or combination of entities in a computing system may implement the logic 800, such as a memory interface 620 of a node, memory routing logic implemented as part of the memory fabric 205, or more. The description below provides one example with respect to the memory interface 620, however any memory interface or routing logic in the computing system may perform the logic 800 as a method or process to trigger the system function takeover upon identifying a store instruction for a failure indication.

The memory interface 620 may identify a store instruction to store a failure indication in a shared memory (802). The failure indication may originate from a first node of a computing system and indicate a failure of a system function of the first node. In response to identifying the store instruction to store the failure indication in the shared memory, the memory interface 620 may instruct a second node in the computing system to replace the system function of the first node (804). The memory interface 620 may be implemented as part of the second node, and thus instructing the second node to replace the system function may include triggering an interrupt to launch an execution thread or process providing the system function in the second node.

In some examples, the memory interface 620 may identify the store instruction to store the failure indication in the shared memory by recognizing that the store instruction targets a particular address in the shared memory that is used to store failure indications. For example, the memory interface 620 may determine the target address for the store instruction is part of an address range allocated for storing failure indications or part of a mailbox or vector source implemented by a node (e.g., the second node). As another example, the memory interface 620 may recognize the store instruction to store the failure indication when the target address of the store instruction is a predetermined or special address (e.g., a negative address or other special address identified by the memory interface 620). As yet another example, the memory interface 620 may identify the store instruction to store the failure indication in the shared memory by determining a message type of the store instruction, such as by identifying that a failure indication flag in a header of the store instruction is set.

As described above, a node in a computing system may store a failure indication in a shared memory, which may trigger takeover of failing system functions of the node. Failure indication storage in a shared memory may facilitate takeover procedures with increased efficiency in speed, as a node may store the failure indication even when networking sub-systems have been compromised or failed. In some cases, the features described herein may support system function takeover with microsecond latency, which may result in reduced system downtime and increased processing availability and efficiency. As the failure indication may be stored in a shared memory commonly accessible by multiple other nodes in the computing system, the features described herein may provide takeover by multiple, different nodes as opposed to a single backup device in double failure vulnerability systems. Thus, the features described herein may provide increased efficiency in system function takeovers and greater system uptime, which may be particularly beneficial for mission critical systems that require constant or near-constant availability.

The systems, methods, devices, circuitry, and logic described above, including the failure identification engine 108, failure response engine 110, takeover engine 410, and memory interface 620, may be implemented in many different ways in many different combinations of hardware, logic, circuitry, and executable instructions stored on a machine-readable medium. For example, the failure identification engine 108, failure response engine 110, takeover engine 410, memory interface 620, or any combination thereof, may include circuitry in a controller, a microprocessor, or an application specific integrated circuit, or may be implemented with discrete logic or components, or a combination of other types of analog or digital circuitry, combined on a single integrated circuit or distributed among multiple integrated circuits. A product, such as a computer program product, may include a storage medium and machine readable instructions stored on the medium, which when executed in an endpoint, computer system, or other device, cause the device to perform operations according to any of the description above, including any features of the failure identification engine 108, failure response engine 110, takeover engine 410, memory interface 620, or combinations thereof.

The processing capability of the systems, engines, devices, logic, and circuitry described herein, including the failure identification engine 108, failure response engine 110, takeover engine 410, and memory interface 620, may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above.

While various examples have been described above, many more implementations are possible.

The invention claimed is:

1. A node of a computing system, the node comprising:
   a failure identification engine to identify a failure condition for a system function of the node; and
   a failure response engine to store a failure indication in a shared memory to trigger takeover of the system function by a different node of the computing system,
   wherein the failure response engine is to store the failure indication at a particular memory region of the shared memory associated with the different node to trigger the takeover of the system function by the different node.

2. The node of claim 1, wherein the failure response engine is to store the failure indication in the shared memory by sending a store instruction for the failure indication across a memory fabric for the shared memory.

3. The node of claim 2, wherein the failure response engine is to store the failure indication in the shared memory further by setting a failure indication flag in a header of the store instruction.

4. The node of claim 1, wherein the failure response engine is to store the failure indication within a particular address range of the shared memory indicating to the different node that the node originated the failure indication.

5. The node of claim 1, wherein the failure response engine is to store the failure indication at multiple memory regions of the shared memory, each of the multiple memory regions associated with a particular node of the computing system.

6. The node of claim 5, wherein the failure response engine is to store the failure indication at a specified location of the multiple memory regions to indicate that the node originated the failure indication.

7. A method comprising:
   identifying a store instruction to store a failure indication in a shared memory, the failure indication originating from a first node of a computing system and indicating a failure of a system function of the first node; and
   in response to identifying the store instruction to store the failure indication in the shared memory, instructing a second node in the computing system to replace the system function of the first node,
   wherein the failure indication is stored at a particular memory region of the shared memory associated with the second node to trigger the takeover of the system function by the different node.

8. The method of claim 7, wherein identifying the store instruction to store the failure indication in the shared memory comprises recognizing that the store instruction targets a particular address in the shared memory that is used to store failure indications.

9. The method of claim 7, wherein identifying the store instruction to store the failure indication in the shared memory comprises determining a message type of the store instruction.

10. The method of claim 9, wherein the determining the message type comprises identifying that a failure indication flag in a header of the store instruction is set.

11. A method comprising:
    identifying that a failure indication has been stored in a shared memory; and, in response:
      determining, from the failure indication stored in the shared memory, a node in a computing system that originated the failure indication;
      determining a system function of the node specified by the failure indication stored in the shared memory; and
      replacing the system function on behalf of the node,
    wherein determining the node that originated the failure indication comprises:
      determining that the failure indication is stored at a particular offset from a reference memory address; and
      correlating the offset to the node.

12. The method of claim 11, wherein determining the node that originated the failure indication comprises identifying that the failure indication is stored in a particular address range in the shared memory associated with the node.

13. The method of claim 11, comprising determining the system function from a failed function indication specified in the failure indication.

* * * * *